(12) United States Patent  
Widmer

(10) Patent No.: US 8,848,286 B2  
(45) Date of Patent: Sep. 30, 2014

(54) LENS PLATE FOR WAFER-LEVEL CAMERA AND METHOD OF MANUFACTURING SAME

(75) Inventor: Leah Widmer, Boulder, CO (US)

(73) Assignee: Omni Version Technology, Inc., Santa Clara, CA (US)

( * ) Notice: Subject to any disclaimer, the term of this patent is extended or adjusted under 35 U.S.C. 154(b) by 150 days.

(21) Appl. No.: 13/444,618

(22) Filed: Apr. 11, 2012

(65) Prior Publication Data

US 2013/0271826 A1    Oct. 17, 2013

(51) Int. Cl.
  *G02B 13/14*    (2006.01)
(52) U.S. Cl.
  USPC ............................ 359/355; 359/454; 359/455
(58) Field of Classification Search
  USPC .......................................... 359/355, 454, 455
  See application file for complete search history.

(56) References Cited

U.S. PATENT DOCUMENTS

| 8,000,041 B1 | 8/2011 | Lin et al. |
| 2010/0142061 A1 | 6/2010 | Choi et al. |
| 2011/0163225 A1 | 7/2011 | Yang |
| 2011/0222171 A1 | 9/2011 | Kintz et al. |
| 2011/0249176 A1 | 10/2011 | Hsueh |
| 2012/0182623 A1* | 7/2012 | Wippermann et al. ......... 359/642 |
| 2012/0200946 A1* | 8/2012 | Wippermann et al. ......... 359/811 |
| 2013/0003184 A1* | 1/2013 | Duparre ......................... 359/622 |

* cited by examiner

*Primary Examiner* — Ricky Mack
*Assistant Examiner* — William Alexander
(74) *Attorney, Agent, or Firm* — Lathrop & Gage LLP

(57) ABSTRACT

A lens plate includes a transparent substrate wafer, and a plurality of lenses and spacers that are formed of a single portion of material on the transparent substrate wafer. An assembly includes a first lens plate that includes a first transparent substrate wafer, a plurality of first lenses and a plurality of spacers, the first lenses and spacers being formed of a single portion of material on said first transparent substrate wafer. The assembly also includes a second lens plate that includes a second transparent substrate wafer and a plurality of second lenses formed thereon, each of the plurality of second lenses corresponding to a respective one of the plurality of first lenses. The lens plates are aligned such that each of the plurality of first lenses aligns with the respective one of the plurality of second lenses, and the lens plates are bonded to one another.

4 Claims, 7 Drawing Sheets

LENS PLATE FOR WAFER-LEVEL CAMERA AND METHOD OF MANUFACTURING SAME

BACKGROUND

This disclosure relates to wafer-level cameras, lens plates for wafer-level cameras and methods of manufacturing lens plates for wafer-level cameras.

A wafer-level camera is a camera having a small footprint that is typically utilized in a mobile phone, notebook computer, tablet computer, among others. A wafer-level camera includes optics to form an image and an image sensor for sensing the image. To form a high quality image, the optics of the camera module may include several lenses, stacked on the image sensor and sometimes separated by spacers.

The wafer-level camera is typically manufactured by stacking and bonding wafers with components thereon, utilizing techniques similar to semiconductor manufacturing. For example, a wafer having a plurality of image sensors may be provided first. A spacer wafer may be placed on the image sensor wafer. The spacer wafer has a plurality of openings, each aligned with one of the image sensors. A wafer having a plurality of lenses, known as a lens plate, is then placed on the spacer wafer. The lenses of the lens plate and the openings of the spacer wafer are aligned with the image sensors. A second spacer wafer may be provided before a second lens plate having a plurality of lenses is placed on the wafer stack. In this manner, multiple spacer wafers and multiple lens plates may be included in the manufacturing of wafer-level cameras. Finally, the stacked wafers are diced into individual wafer-level cameras each having an image sensor and a stack of spacers and lenses.

In wafer-level cameras, one or more spacer wafers are typically aligned with a lens plate, and bonded to the lens plate using an epoxy. This is commonly done before lenses are formed on the lens plate. This spacer-to-lens-plate bonding may be difficult, since epoxy must be applied between the spacer wafer and the lens plate, but not in or over any spacer openings. Also, an uneven bond thickness can result in variable spacer thickness.

Conventional spacer wafers for wafer-level cameras are commonly formed of glass wafers, manufactured by drilling holes through the glass wafers. The drilling process can be carried out by laser cutting, abrasive water jet cutting, sand-blasting, chemical etching or other processes. Laser drilling is extremely expensive and time consuming; for example, it is not uncommon for 80 percent of the total manufacturing cost of a spacer wafer for a wafer-level camera to be associated with laser drilling. Laser drilling also involves long lead times. If a new array pitch or opening diameter is required, it may take weeks or longer to procure a spacer wafer. This is especially problematic for rapid prototyping of lens designs and development work. Also, in conventional approaches, the possible spacer thicknesses are limited to the available standard glass wafer thicknesses.

SUMMARY

In an embodiment, a lens plate includes a transparent substrate wafer and a plurality of lenses and a plurality of spacers that are formed of a single portion of material on the transparent substrate wafer.

In an embodiment, an assembly includes a first lens plate that includes a first transparent substrate wafer, a plurality of first lenses and a plurality of spacers, the first lenses and spacers being formed of a single portion of material on said first transparent substrate wafer. The assembly also includes a second lens plate that includes a second transparent substrate wafer and a plurality of second lenses formed thereon, each of the plurality of second lenses corresponding to a respective one of the plurality of first lenses. The lens plates are aligned such that each of the plurality of first lenses aligns with the respective one of the plurality of second lenses, and the lens plates are bonded to one another.

In an embodiment, a method for making a lens plate includes dispensing a first portion of material onto a tool that forms recesses corresponding to spacers and lenses, and disposing a first side of a transparent substrate wafer onto said first portion of material. The method also includes adjusting a position of said transparent substrate wafer to provide said first portion of material with a spacer thickness and a lens thickness for each of the spacers and lenses respectively, and curing the first portion of material.

BRIEF DESCRIPTION OF THE DRAWINGS

The foregoing and other features and advantages of the disclosure will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION OF THE DRAWINGS

According to embodiments, a lens plate is manufactured by forming a plurality of lenses and a plurality of spacers on a transparent substrate wafer. All of the lenses and spacers on a wafer are formed from a single portion of material (e.g., an epoxy), optionally utilizing a one-step curing process. Because any required spacers are generated as part of this process, a separate spacer wafer is not required.

Figure 1:
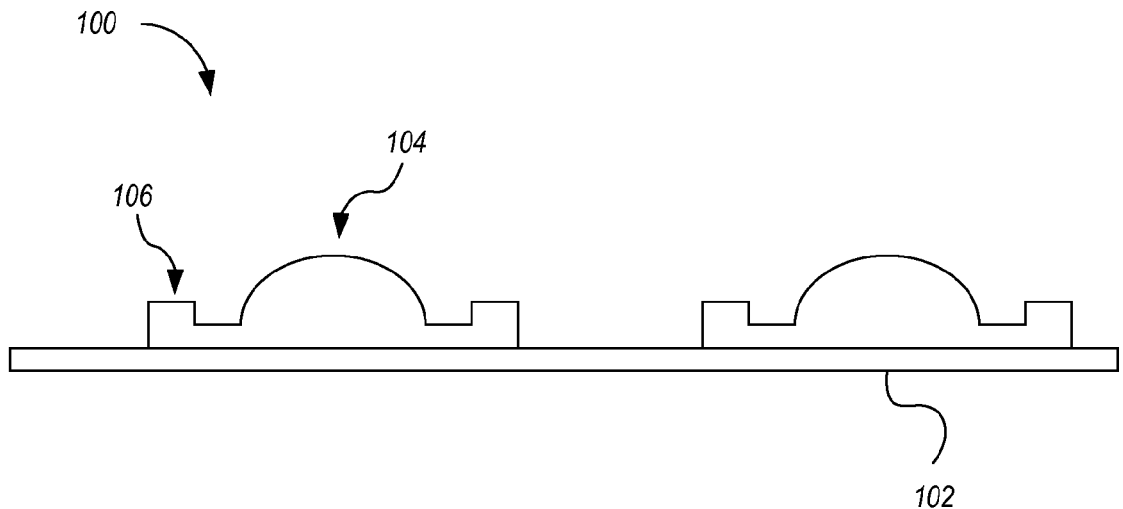
FIG. 1 is a schematic cross-sectional diagram of a portion of a conventional lens plate.

FIG. 1 is a schematic cross-sectional diagram of a conventional lens plate 100. Lens plate 100 includes a transparent substrate wafer 102, which may be a glass, fused silica, quartz, or $CaF_2$ substrate, or other optical grade transparent substrate. A plurality of lenses 104 are formed on substrate wafer 102. Lens 104 may be surrounded by a yard 106; in this application, "yard" denotes lens material located in a region that is not part of the optical design of a wafer-level camera and is associated with an individually formed lens.

Figure 2:
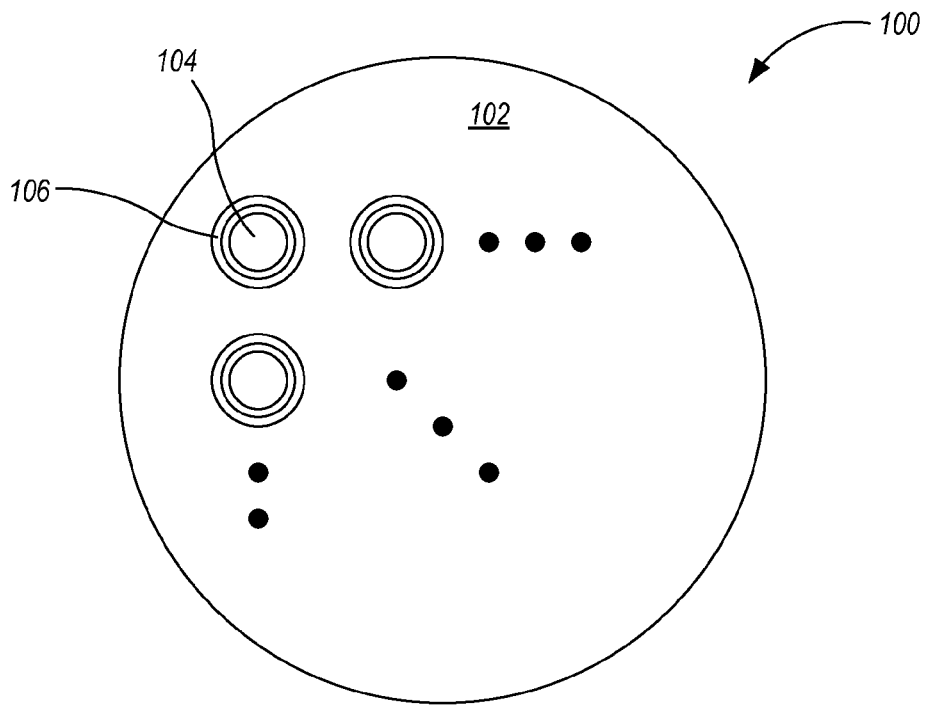
FIG. 2 is a schematic diagram of a planar view of a conventional lens plate.

Yard 106 may provide flexibility for a lens replication process; for example, yard 106 may be used as an overflow region of material dispensed for forming lenses. That is, the volume of a droplet of material dispensed to form a lens has at least some associated volume tolerance, and yards can be used so that slightly more material than needed can be dispensed, and the excess material will have somewhere to go. However, yards may present certain design limitations, such as size of the yard, the minimum spacer to yard distance, and yard volume tolerance. Yards can also present stray light problems. FIG. 2 is a schematic diagram of a planar view of lens plate 100 showing lenses 104, each lens 104 connecting to a surrounding yard 106.

Figure 3:
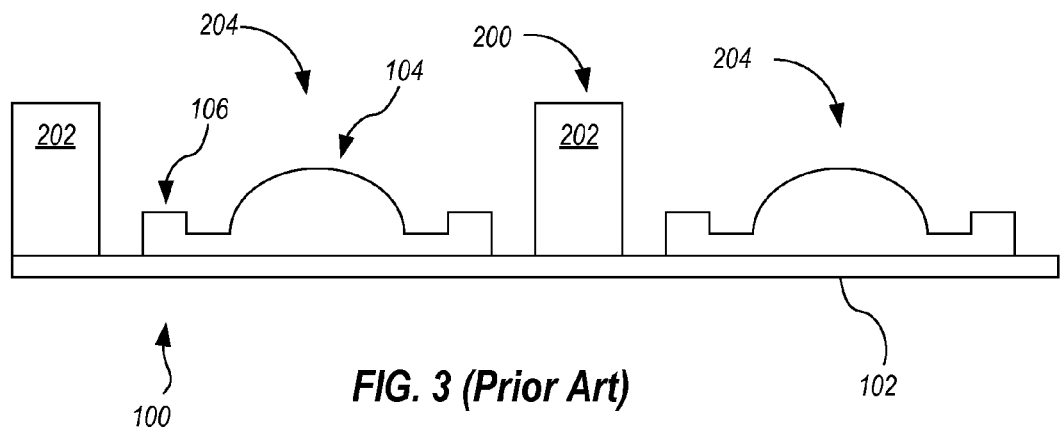
FIG. 3 is a schematic cross-sectional diagram of a portion of a spacer wafer being aligned, stacked, and bonded onto a lens plate.
Figure 4:
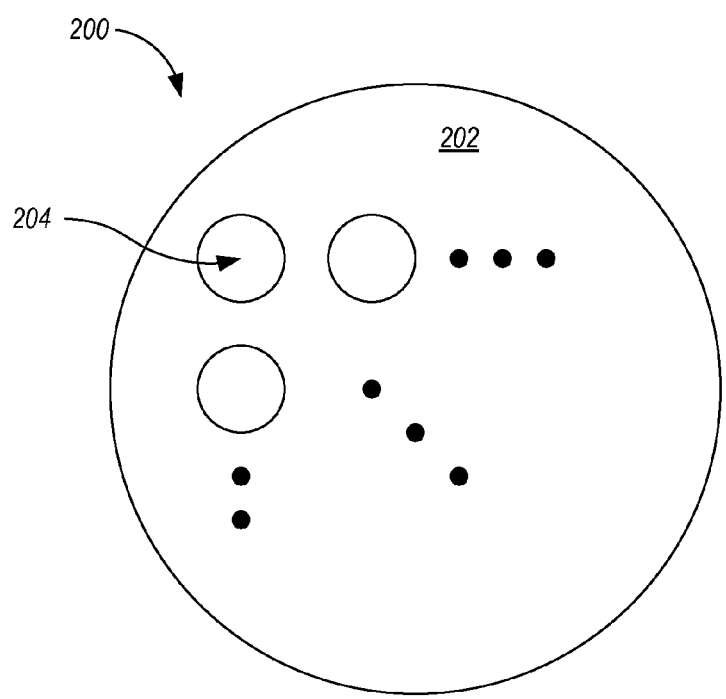
FIG. 4 is a schematic diagram of a planar view of a portion of a spacer wafer.

FIG. 3 is a schematic cross-sectional diagram of a spacer wafer 200 that is aligned, stacked, and bonded onto lens plate 100. Spacer wafer 200 includes spacers 202 and openings 204. Openings 204 are aligned with lenses 104 of lens plate 100. FIG. 4 is a schematic diagram of a planar view of spacer wafer 200, illustrating spacers 202 and openings 204.

In an embodiment, yards are eliminated. This potentially decreases the size of the lens and increases die count, that is, a number of die level cameras that can be manufactured per wafer assembly. Increasing die count is desirable because the more dies per wafer, the lower the cost per die; also, smaller die may enable end products that are smaller and/or lighter.

Figure 5:
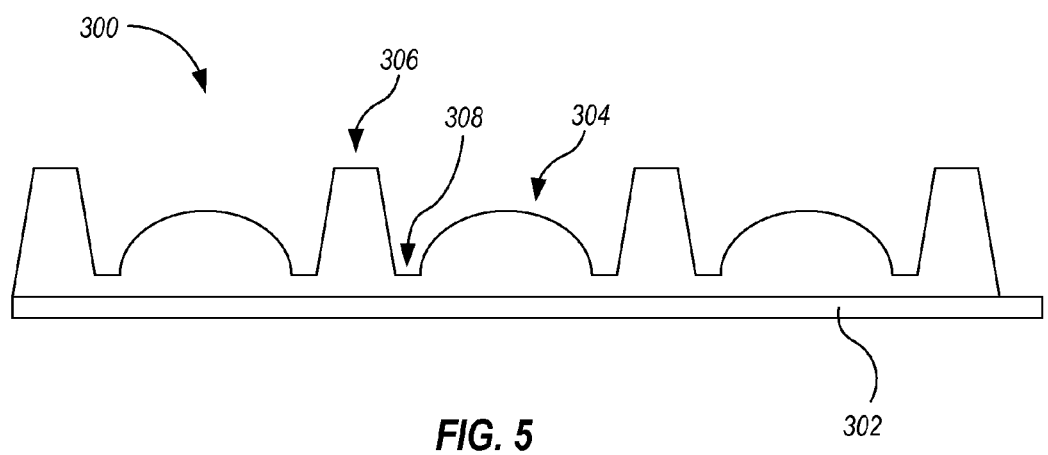
FIG. 5 is a schematic cross-sectional diagram of a portion of a lens plate according to exemplary embodiments.

FIG. 5 is a schematic cross-sectional diagram of a lens plate 300 according to exemplary embodiments. Lens plate 300 includes a transparent substrate wafer 302, which may be a glass, fused silica, quartz, or $CaF_2$ substrate, or other optical grade transparent substrate. A plurality of lenses 304 and a plurality of spacers 306 are formed on substrate wafer 302 of a single portion of material, optionally utilizing a one-step curing process. Lens 304 is not surrounded by yards, because a volume tolerance for the dispensed material is accommodated in other ways, as discussed below (see, e.g., FIG. 8). Spacer 306 and lens 304 may be connected by a contiguous sheet 308.

Figure 6:
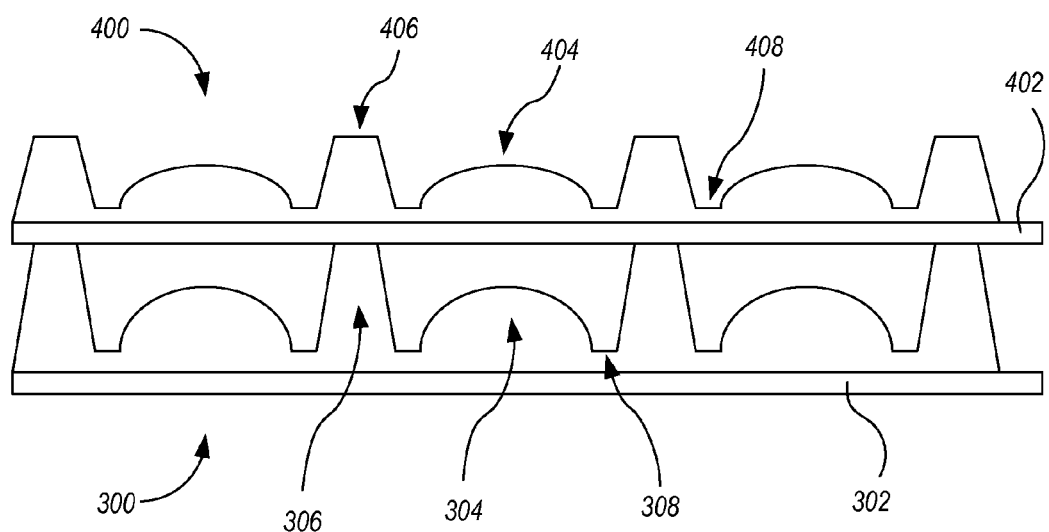
FIG. 6 is a schematic cross-sectional diagram of a portion of a lens plate stacked onto another lens plate according to exemplary embodiments.

FIG. 6 shows an exemplary lens module including a lens plate 400 stacked onto lens plate 300. Lens plate 400 includes a plurality of lenses 404 and a plurality of spacers 406, connected by a contiguous sheet 408, on a transparent substrate 402. Lenses 404, spacers 406 and contiguous sheet 408 are formed of a single portion of material. Lenses 404 are aligned with lenses 304. The thickness of spacer 306 is incorporated into design of the lens module. Of course, more than two lens plates may be stacked, according to the design of the lens module.

Figure 7:
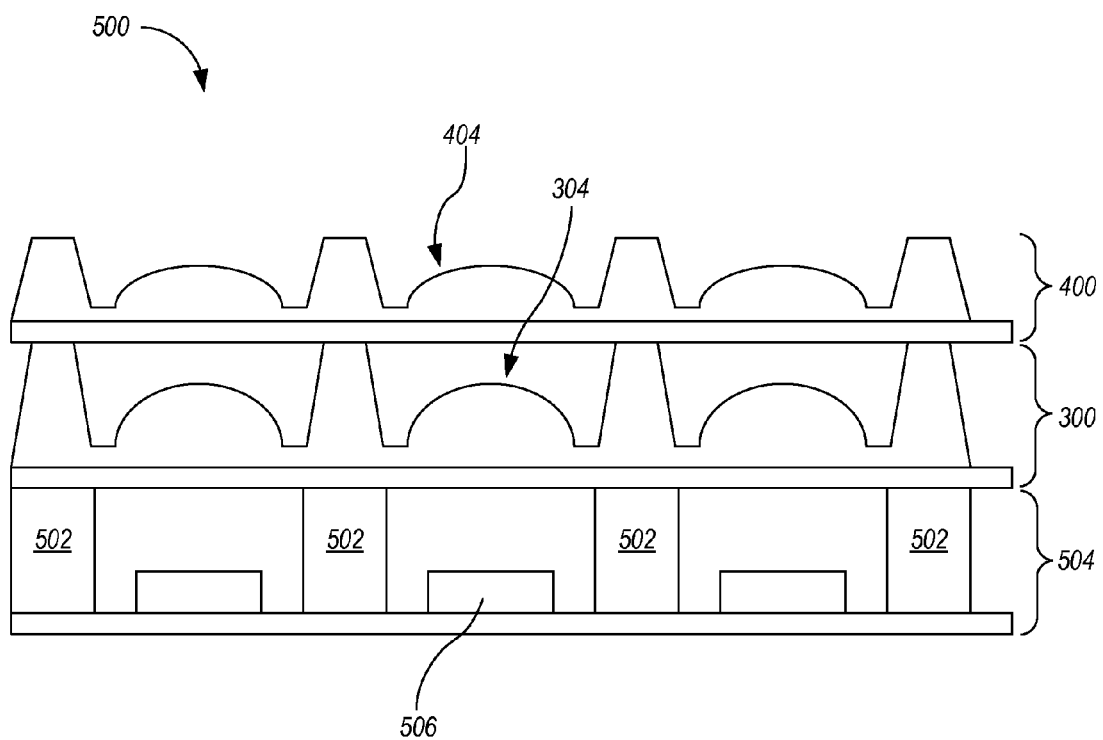
FIG. 7 is a schematic cross-sectional diagram of a portion of a wafer forming wafer-level cameras, according to exemplary embodiments.

FIG. 7 shows an exemplary assembly 500 of wafer-level cameras, including a substrate wafer 504 having a plurality of image sensors 506, spacers 502 (e.g., a spacer wafer) and lens plates 300 and 400. Lenses 304 and 404 are aligned in one to one correspondence with each other, and with image sensors 506. Assembly 500 shown in FIG. 7 may alternatively be manufactured by fabricating lens plate 300 as a double sided lens plate, with spacers 502 on a bottom side thereof, according to the techniques described herein (see, e.g., FIG. 11). Then, lens plate 300 may attach directly with substrate wafer 504, omitting the spacer wafer.

Figure 8:
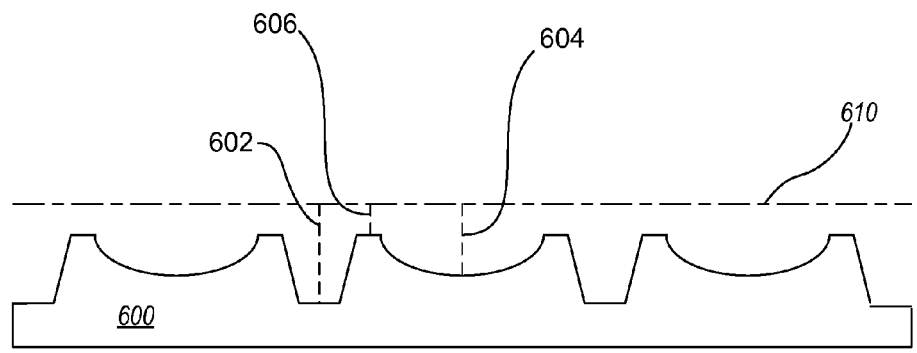
FIG. 8 is a schematic cross-sectional diagram of a portion of a metal master tool according to exemplary embodiments.

For illustration, lens plate 300 may be manufactured as follows. First, a metal master tool 600 is provided as shown in FIG. 8. Metal tool 600 has recesses for forming spacers and lenses, and provides spacing 602 for spacers, spacing 604 for lenses and optionally spacing 606 for a contiguous sheet of material, with respect to a datum 610. Next, a plastic mold is replicated from metal master tool 600, creating a negative mold of metal master tool 600. A tool 700, formed of PDMS (Polydimethyl Siloxane) is then molded from the plastic mold. PDMS tool 700 thus replicates features of metal master tool 600.

Figure 9:
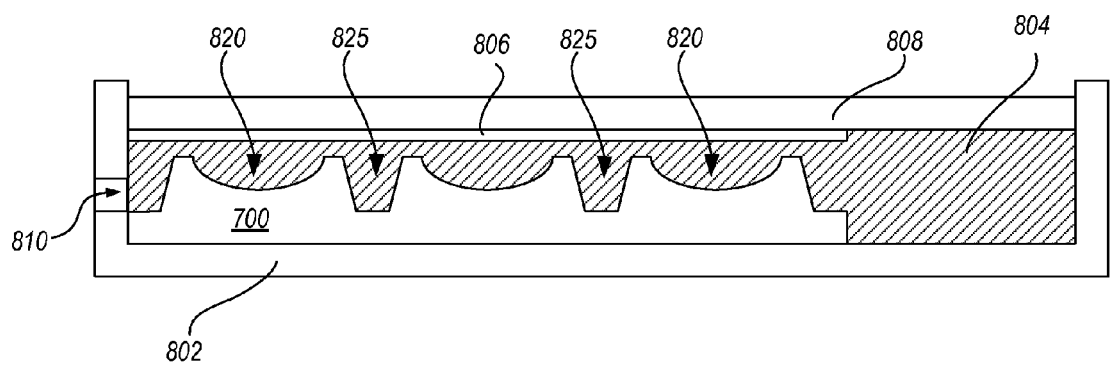
FIG. 9 is a schematic diagram of a tool in a fixture for manufacturing a lens plate according to exemplary embodiments.

FIG. 9 shows the replicated PDMS tool 700 being placed in a fixture 802. A single portion of material 804, which may be (or include) an ultraviolet ("UV")-curable polymer compound, is dispensed onto PDMS tool 700. One advantage of this method is that the material is dispensed all at once instead of individually into many (e.g., thousands of) lens and spacer locations, such as lens locations 820 and spacer locations 825 shown in FIG. 9. This method minimizes chances for misalignment of dispensed material intended to form individual lenses of a lens array on tool 700, and minimizes dispensing tolerance problems associated with small volume dispensing and the high cost of precision dispensing equipment. Next, a transparent substrate wafer 806 (e.g., a glass wafer) is placed on top of dispensed material 804, and a translucent lid 808 is placed over the whole fixture 802 to enclose fixture 802. Vacuum is applied through channels 810, and material 804 expands to fill PDMS tool 700. The position of transparent substrate wafer 806 is controlled for providing the thickness of spacers, the thickness of lenses, and optionally the thickness of a contiguous sheet connecting all of the spacers and lenses. Material 804 is UV cured through translucent lid 808, which may be cured in a one-step curing process. After the material is cured, translucent lid 808 is removed. A vacuum chuck is employed to remove transparent substrate wafer 806 from tool 700. Forming material 804 as lenses and spacers connected by a contiguous sheet may be advantageous during the removal of wafer 806 from tool 700, because the cured material will separate from tool 700 as one piece, instead of many small pieces that would result if each of the lenses was fabricated separately.

Figure 10:
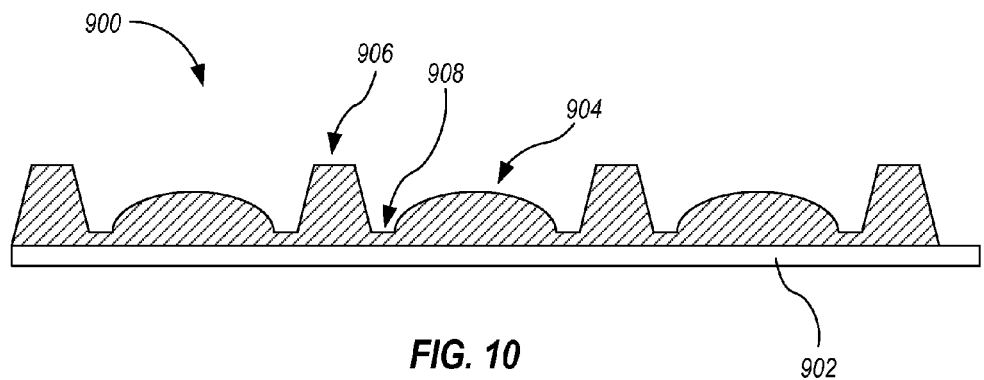
FIG. 10 is a schematic cross-sectional diagram of a manufactured lens plate according to exemplary embodiments.

FIG. 10 shows a manufactured lens plate 900 including a transparent substrate wafer 902, with a plurality of lenses 904, and a plurality of spacers 906 manufactured from a single portion of material thereon. Lens plate 900 may include a contiguous sheet 908 connecting all of lenses 904 and spacers 906. Lenses 904, spacers 906, and contiguous sheet 908 are formed using the same material, optionally utilizing a one-step curing process. To form wafer level lens modules, lens plate 900 may be stacked with one or more other lens plates, without having to align, stack, and bond separate spacer wafer (s). The lens modules formed by stacking lens plate 900 with other lens plates may be further stacked onto a wafer having a plurality of image sensors, to form an array of wafer level cameras.

Figure 11:
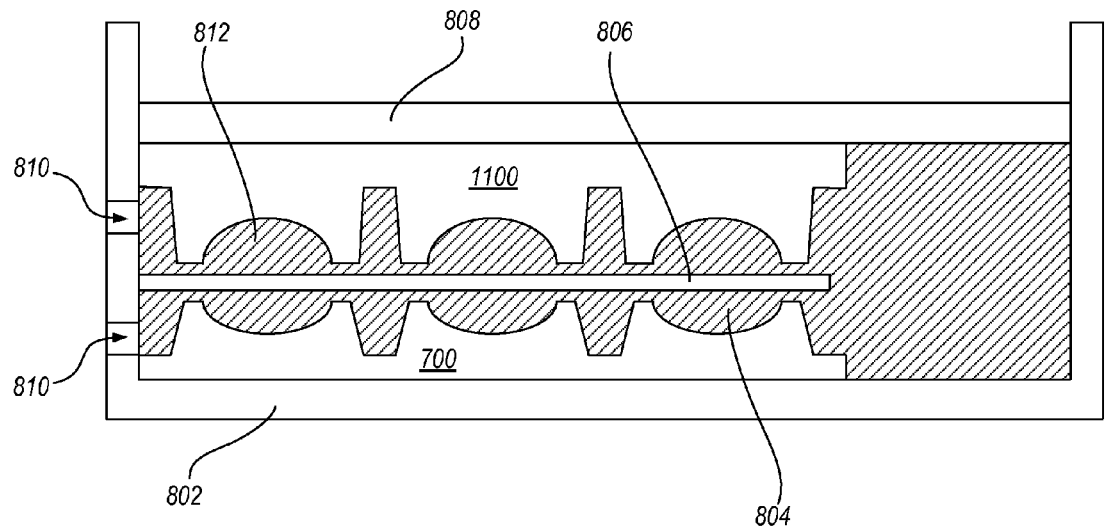
FIG. 11 is a schematic diagram of tools in a fixture for manufacturing a lens plate having double sided lenses and spacers, according to exemplary embodiments.

A double sided lens plate having lenses and spacers on both sides may be manufactured using similar fixture and an additional tool placed on the transparent substrate wafer as shown in FIG. 11. FIG. 11 is similar to FIG. 10, but shows a second tool 1100 having recesses for forming second spacers and second lenses, on a second side of transparent substrate wafer 806. Tool 1100 is applied after the processing illustrated in FIG. 9, and before transparent lid 808 is placed over the lens plate assembly. As discussed below, a second portion of material 812 is dispensed onto transparent substrate 806, then tool 1100 is placed onto material 812. Height of tool 1100 is adjusted to provide the desired lens and spacer thicknesses. After the height of tool 1100 is adjusted, transparent lid 808 may be placed over the lens plate assembly and vacuum may optionally be drawn through openings 810 to remove excess material. At this point, both portions of material 804 and 812 may be cured to form lenses and spacers. As shown in FIG. 11, tool 1100 may include differently shaped features as compared to tool 700, but similar or identical shapes can be made on both sides of a double sided lens plate.

Figure 12:
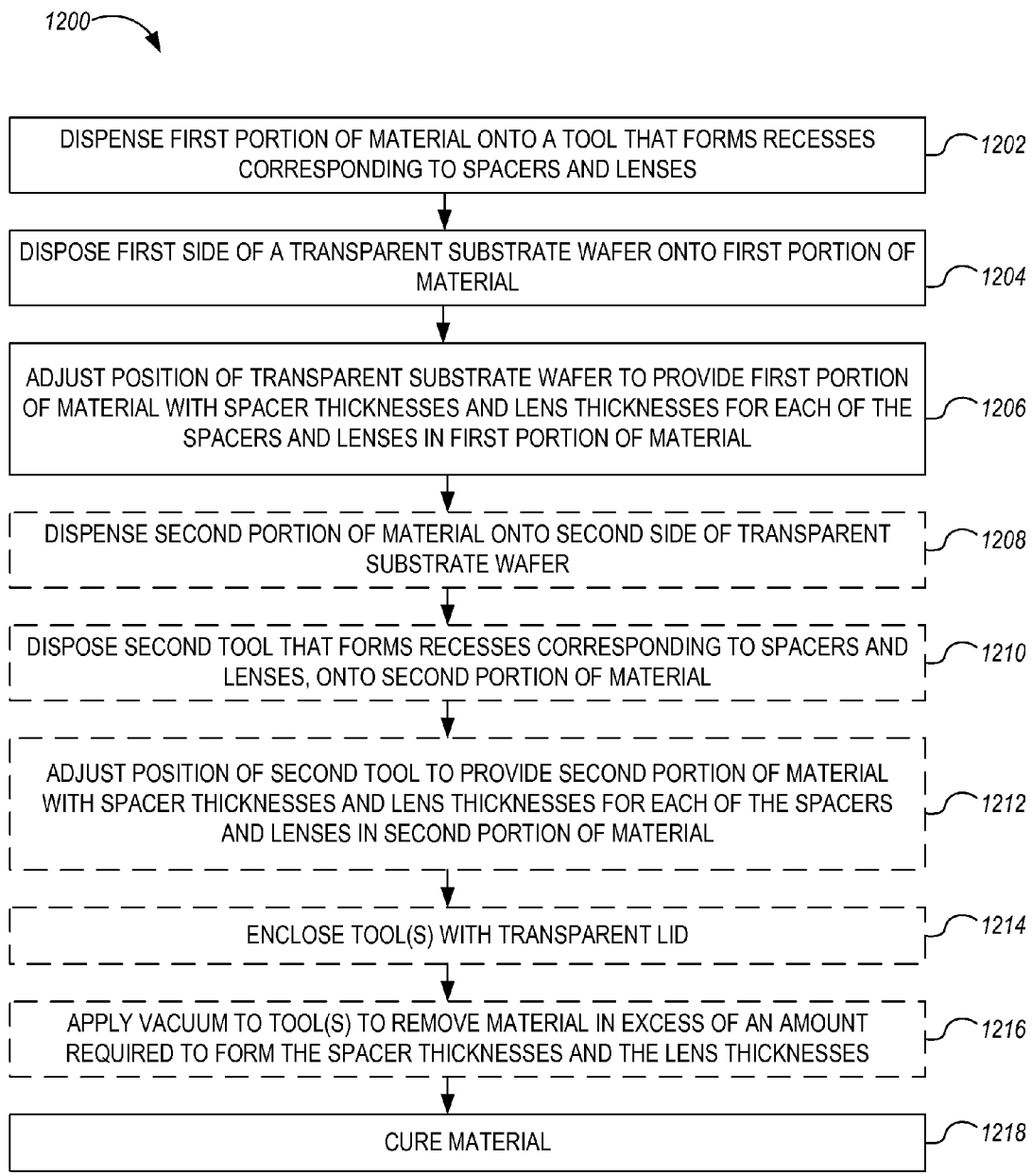
FIG. 12 is a flowchart of a method for making a lens plate, in an embodiment.

FIG. 12 is a flowchart of a method 1200 for making a lens plate. Step 1202 dispenses a first portion of material onto a tool that forms recesses corresponding to spacers and lenses. An example of step 1202 is dispensing material 804 onto tool 700, FIG. 9. In step 1204, a first side of a transparent substrate wafer is disposed onto the first portion of material. An example of step 1204 is placing transparent substrate wafer 806 on top of material 804, FIG. 9. Step 1206 adjusts a position of the transparent substrate wafer to provide the first portion of material with spacer thicknesses and lens thicknesses for each of the spacers and lenses being formed in the first portion of material. An example of step 1206 is controlling a position of transparent substrate wafer 806, FIG. 9. When a double sided lens plate is being formed, an optional step 1208 dispenses a second portion of material onto a second side of the transparent substrate wafer, and in an optional step 1210, a second tool is disposed onto the second portion of material. An example of steps 1208 and 1210 is dispensing material 812 onto transparent substrate wafer 806, FIG. 11, and subsequently disposing tool 1100 thereon. In another optional step 1212, a position of the second tool is adjusted to provide the second portion of material with spacer thicknesses and lens thicknesses for each of the spacers and lenses being formed in the second portion of material. An example of step 1212 is adjusting height of tool 1100, FIG. 11. In another optional step 1214, the tool(s) are enclosed within a fixture having a transparent lid. Examples of step 1214 are placing transparent lid 808 atop transparent substrate wafer 806, FIG. 9, or atop tool 1100, FIG. 11, thus enclosing the tools, portions of material, and transparent substrate wafer within fixture 802 and transparent lid 808. In another optional step 1216, vacuum is applied to one or more of the materials to remove material in the first and/or second portions of material that is in excess of an amount required to form the spacer and lens thicknesses. An example of step 1216 is applying vacuum through openings 810, FIG. 9 and FIG. 11. In step 1218, the first (and optionally, second) portion of material is cured. An example of step 1216 is utilizing a UV curable epoxy as material 804 and/or material 812, and curing the material(s) using UV light.

While the present disclosure has shown and described exemplary embodiments, it will be understood by those of ordinary skill in the art that various changes in form and details may be made therein without departing from the spirit and scope of the present disclosure, as defined by the following claims.

What is claimed is:

1. A lens plate, comprising:
 a first transparent substrate wafer;
 a second transparent substrate wafer; and
 a plurality of lenses and a plurality of spacers that are formed of a single portion of material, on said first transparent substrate wafer
 wherein:
  a top surface of each of said spacers is flat and bonded onto the second transparent substrate wafer using a bonding material, and
  the total thickness between the first and second transparent substrate wafers is defined by the dimensions of the spacers and the bonding material.

2. The lens plate of claim 1, further comprising a contiguous sheet that connects said plurality of lenses and said plurality of spacers with one another, and wherein said contiguous sheet, said plurality of lenses, and said plurality of spacers are formed using the single portion of material in a one-step curing process.

3. The lens plate of claim 1, wherein the single portion of material comprises an ultraviolet ("UV")-curable polymer compound.

4. The lens plate of claim 1, wherein said first and second transparent substrate wafers are one of a glass wafer, a fused silica wafer, a quartz wafer, and a $CaF_2$ wafer.

* * * * *